United States Patent
Heck et al.

(10) Patent No.: US 9,780,345 B2
(45) Date of Patent: Oct. 3, 2017

(54) DEVICE FOR ELECTRICALLY INTERCONNECTING CELLS IN A BATTERY PACK BY MEANS OF CELL CONNECTORS AND BATTERY PACK WITH SUCH CELL CONNECTORS

(75) Inventors: Harald Heck, Nuremberg (DE); Andreas Volek, Herzogenaurach (DE); Ralf Hojda, Altena (DE); Uwe Marx, Seeheim-Jugenheim (DE); Harald Wich, Lauf (DE); Rolf Pechloff, Wittelshofen (DE); Frank Warmuth, Borkheide (DE); Dirk Hopsch, Berlin (DE); Jörg Seybold, Diepersdorf (DE); Hubertus Goesmann, Auernheim (DE); Philipp Petz, München (DE); Axelle Hauck, Neubiberg (DE)

(73) Assignees: DIEHL STIFTUNG & CO. KG, Nuremberg (DE); BAYERISCHE MOTOREN WERKE AG, Munich (DE)

( * ) Notice: Subject to any disclaimer, the term of this patent is extended or adjusted under 35 U.S.C. 154(b) by 0 days.

(21) Appl. No.: 13/499,801

(22) PCT Filed: Sep. 30, 2010

(86) PCT No.: PCT/EP2010/005956
§ 371 (c)(1),
(2), (4) Date: May 29, 2012

(87) PCT Pub. No.: WO2011/038908
PCT Pub. Date: Apr. 7, 2011

(65) Prior Publication Data
US 2012/0231320 A1    Sep. 13, 2012

(30) Foreign Application Priority Data
Oct. 1, 2009 (DE) .................. 10 2009 043 670

(51) Int. Cl.
*H01M 2/20* (2006.01)
*H01M 10/04* (2006.01)
(Continued)

(52) U.S. Cl.
CPC ......... *H01M 2/1077* (2013.01); *H01M 2/206* (2013.01); *H01M 10/425* (2013.01)

(58) Field of Classification Search
USPC .................. 429/96–100, 121–123, 158–161
See application file for complete search history.

(56) References Cited

U.S. PATENT DOCUMENTS 5,578,392 A * 11/1996 Kawamura ..................... 429/99
6,240,637 B1 * 6/2001 Ikeda et al. ..................... 29/854
(Continued)

FOREIGN PATENT DOCUMENTS

DE    198 10 746 A 1    9/1999
DE    10 2004 049 185 A1    1/2006
(Continued)

OTHER PUBLICATIONS

International Search Report dated Feb. 4, 2011 filed in PCT/EP2010/005956.
(Continued)

*Primary Examiner* — Osei Amponsah
(74) *Attorney, Agent, or Firm* — Scully Scott Murphy and Presser

(57) ABSTRACT

A device for electrical interconnection of cells of a battery pack through cell connectors, and a battery pack having the device and the cell connectors are provided. A plurality of cell connectors for connection of at least two cell poles are fitted on a mounting plate, electrically isolated from one another. Each cell connector has at least one flexible bracket which extends away from a connection area. The flexible
(Continued)

brackets are coupled to the connection area through a resilient structure having a meandering shape.

16 Claims, 7 Drawing Sheets

(51) Int. Cl.
*H01M 2/10* (2006.01)
*H01M 10/42* (2006.01)

(56) References Cited

U.S. PATENT DOCUMENTS

| | | | | |
|---|---|---|---|---|
| 6,399,238 | B1* | 6/2002 | Oweis et al. | 429/99 |
| 6,972,544 | B2* | 12/2005 | Seman et al. | 320/112 |
| 7,029,787 | B2* | 4/2006 | Bando et al. | 429/156 |
| 8,962,172 | B2 | 2/2015 | Bolze et al. | |
| 2007/0099073 | A1 | 5/2007 | White et al. | |
| 2008/0131765 | A1* | 6/2008 | Imanaga | H01M 2/206 429/160 |
| 2011/0151305 | A1* | 6/2011 | Bolze | H01M 2/206 429/120 |

FOREIGN PATENT DOCUMENTS

| | | | |
|---|---|---|---|
| DE | 10 2007020 295 A1 | 11/2008 | |
| DE | 20 2009 012 647 U1 | 12/2009 | |
| EP | 1 058 332 A2 | 12/2000 | |
| KR | WO 2008/038916 * | 4/2008 | H01M 2/10 |
| WO | WO 2008/038916 A1 | 4/2008 | |
| WO | 2009041735 A1 | 4/2009 | |
| WO | WO 2009/080148 A2 | 7/2009 | |
| WO | WO 2009/140277 A1 | 11/2009 | |
| WO | 2010/012341 A1 | 2/2010 | |

OTHER PUBLICATIONS

Kaner, V. R. B. et al., "Elektrisch leitende Kunststoffe" Spektrum der Wissenschaff 54-59 (Apr. 1988) with English language abstract.
https://de.wikitionary.org/w/index.php?title=Mäander &oldid=1038036, accessed Nov. 21, 2016. 3 pages Mäander (in English and German).
Duden | Mäander | Spelling, meaning, definition, Meander, the http://translate.googleusercontent.com/translate c? depth=1 &rurl=translate.google.co . . . Feb. 27, 2017 2 pages.
Mäander—Wikipedia, the free encyclopedia meander http://translate.googleusercontent.com/translate_c?dephy-1&rurl=tranalate.google.co . . . Feb. 27, 2017 3 pages.

* cited by examiner

DEVICE FOR ELECTRICALLY INTERCONNECTING CELLS IN A BATTERY PACK BY MEANS OF CELL CONNECTORS AND BATTERY PACK WITH SUCH CELL CONNECTORS

BACKGROUND

The invention relates to a device for electrical interconnection of cells of a battery pack by means of cell connectors, and to a battery pack, in particular as an energy store for electric-motor traction and stationary applications.

Document WO 2009/080148 A2 discloses cell connectors in the form of a solid high-current bridging bolt, which is perforated at both ends, between mutually adjacent cell poles of opposite polarities of individual electrochemical cells which can be connected in series to form the battery pack. Compensation sleeves are inserted into the holes in each cell connector, the external diameter of which compensation sleeves is smaller than and the axial length of which compensation sleeves is longer than the respective hole. The freely projecting poles of the cells engage in these sleeves. In this case, each of the compensation sleeves is shifted within its hole on the basis of the manufacturing-dependent tolerances of the pole positions. The compensation sleeves which have been positioned individually in this way are then welded on one side to their cell poles and on the other side to the cell connector. Because of the tolerance compensation via the sleeves which can initially still be shifted in the cell connector, the cells are thus admittedly connected to one another without any mechanical force being introduced; however, because of the solid cell connectors, there is a threat of considerable destructive forces if the cell poles are shifted as a result of heating during operation after the sleeves have been firmly welded. In addition, this cell interconnection does not allow battery management without the additional use of measurement and control lines which have to be connected separately to the cell poles.

The last-mentioned disadvantage is overcome by a circuit board in DE 1 98 10 746 B4. The conductor tracks formed thereon lead from the cell poles, which are placed along the edge of the board, to the central area of the board, which is fitted with a circuit for battery management, and to shunts for matching the states of charge of the individual cells to one another, as well as to multiple plugs as data interfaces. The conductor tracks are plugged onto the cell poles, which end on a plane, with contact being made, in holes in the board. Bolt-like drilled-through cell connectors are plugged onto in each case two cell poles, and this two-layer arrangement of cell connectors and a circuit board located underneath them is finally braced against the ends of the cells, by means of screw connections on the cell poles. Because the circuit board is in each case rigidly screwed between the solid cell connectors and the cell ends, being borne in a manner which is often over defined, while use results in vibrations and temperature-dependent forces from the cells acting via the board on the cell connectors, a flexible material is chosen for the board. However, this involves the risk of conductor track fractures particularly in the immediate vicinity of the pole screw connections, and therefore the risk of failure of the entire battery pack of a rechargeable traction battery such as this, because the battery management means no longer operate correctly.

SUMMARY

In the light of the above circumstances, the present invention is based on the technical problem of specifying an operationally reliable device of this generic type using pole connection technology which can be handled easier, which device also results in advantageous capabilities from the handling point of view for connection of measures for battery management.

The cell connectors may each essentially be designed as flexible brackets composed of electrically conductive material which can be fixed in their connection area on a mounting plate composed of electrically insulating material, depending on the mutual arrangement of two cells to be interconnected, for example with their profiles aligned with one another. Each bracket can be supported on the mounting plate by its free end that is remote from the connection area, in particular such that it can be shifted resiliently. All of the cell connectors which are attached to a mounting plate on the basis of the geometry of the cell pole arrangement can be connected to cell poles essentially at the same time by fitting the mounting plate with its cell connectors on the cells, in particular by pushing it on, and, if required, by additionally being latched or held in some other way. Vibration-dependent or operating-temperature-dependent shifts or position changes of the cell poles can be compensated for. By way of example, position changes resulting from the flanks on both sides of the apex of the elastically flexible brackets becoming steeper or shallower can be equalized or compensated for, by shifting their free ends, which are supported against the mounting plate like bending springs. It is also possible for position changes to be compensated for by resilient, in particular meandering, structures between the bracket and the connection area. This makes it possible to effectively avoid introduction of destruction-critical compression or bending loads from the cell connectors via the cell poles into the cells.

Expediently, if provided, each bracket has a hole, preferably in its central or apex area which is raised off the mounting plate, the area of which hole is preferably less than the end area of the cell poles, such that, when the mounting plate is placed on the battery pack, the hole edge is pressed onto the end surface of a cell pole. The mounting plate itself has aperture openings of the somewhat larger diameter coaxially with respect to these holes, through which openings the cell connector brackets can finally be connected integrally, in particular by laser welding or soldering, at their hole edges to the end surfaces of the cell poles.

These cell connectors, which in particular are designed like multiple brackets, are expediently produced from a sheet-metal material with adequate springing and current-carrying characteristics, for example from sheet steel or preferably from copper, a copper alloy, from aluminum or an aluminum alloy. The cell connectors are preferably stamped out with the holes being introduced, and, to the extent desired, are in this case curved up out of their original plane to the brackets, in the surrounding area on both sides of a hole.

In this case, a stamped grid of conductor tracks is preferably stamped out at the same time from the material, for example the sheet-metal material, from which the cell connectors are produced, such that the conductor tracks each remain integrally connected by one end to the central area between the brackets of a cell connector. Plug pins can, in particular, be formed at further ends of the conductor tracks, for example for battery management for connection of measurement and control circuits to the cell poles.

BRIEF DESCRIPTION OF THE DRAWINGS

Additional alternatives and developments within the scope of the present invention will become evident from the further claims and, also taking account of their advantages, from the following description of preferred exemplary embodiments, which are sketched on a reduced scale. In the attached figures:

DETAILED DESCRIPTION OF EXEMPLARY EMBODIMENTS

Figure 1:
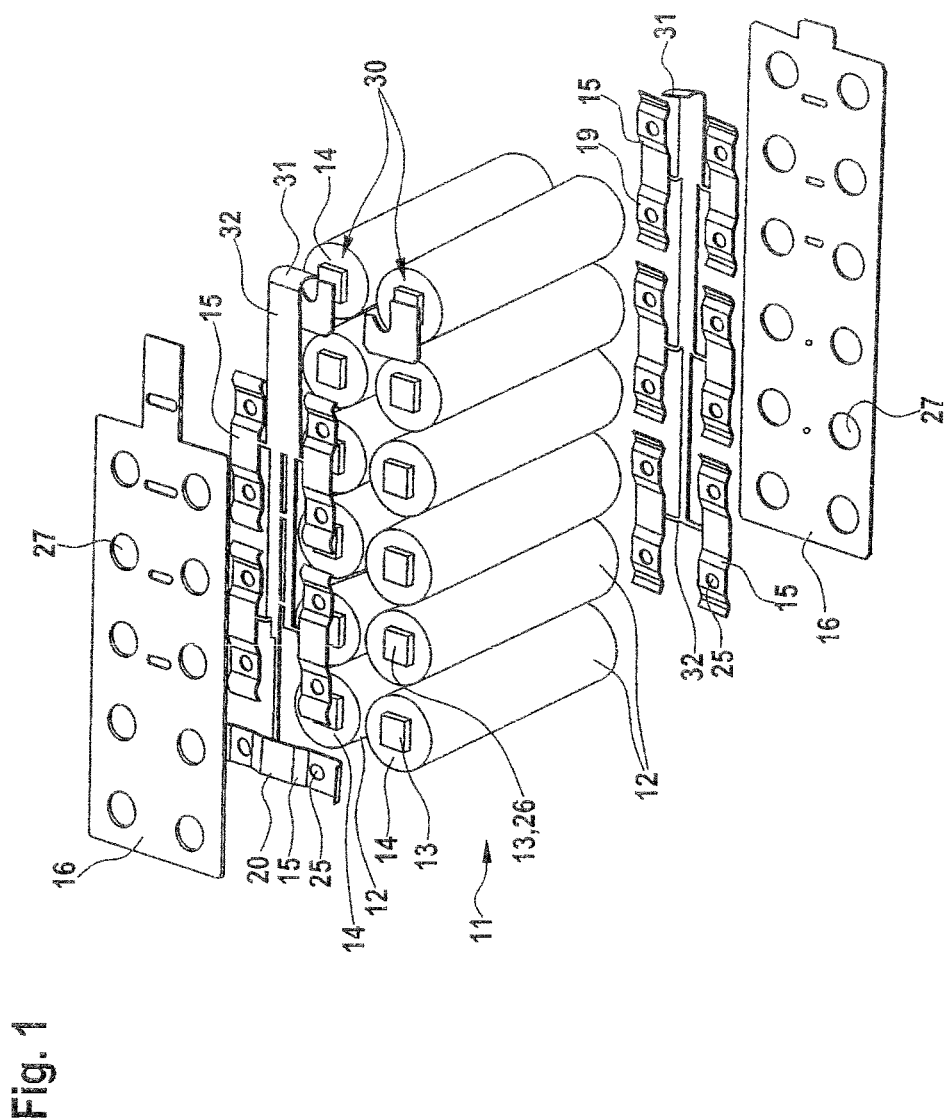
FIG. 1 shows an exploded illustration of a battery pack comprising parallel-arranged cylindrical cells with cell poles which emerge at the mutually opposite ends thereof and are each electrically connected in series by means of flexible cell connectors, on an upper and on a lower mounting plate.

A battery pack 11 has a number of, for example, cylindrical cells 12 mounted parallel to the axis, whose cell poles 13 in this case emerge from the respective cell 12 on mutually opposite ends 14 of the respective cell 12, with their end surfaces 26 in this case being located in each case essentially on an upper and a lower plane, respectively. In this case, the cells 12, which are arranged in two rows here, are oriented such that alternate +/− polarities are adjacent to one another on the cell poles 13.

For the electrical series connection of the cells 12, as described in the following text, for obtaining their sum voltage from the output voltage of the battery pack 11 at its battery connections 30, two adjacent ones of these cell poles 13 of mutually opposite polarities +/− are always interconnected by means of a flexible high-current cell connector 15, using the device according to the invention. As sketched in FIG. 1, these cell connectors 15 are arranged (cf. also FIG. 2) electrically isolated from one another on two mounting plates 16, which are preferably manufactured by plastic injection molding, in a geometric sequence that is such that said cell connectors 15 make contact with the end surfaces 26 of the cell poles 13—with the mounting plates 16 being pushed on in the direction of the upper and lower ends 14 of the cells 12. This simple handling of the mounting plate 16 which has been populated with two-bracket cell connectors 15 results in all the cell poles 13 of a cell end 14 being electrically connected in series in one go.

Figure 3:
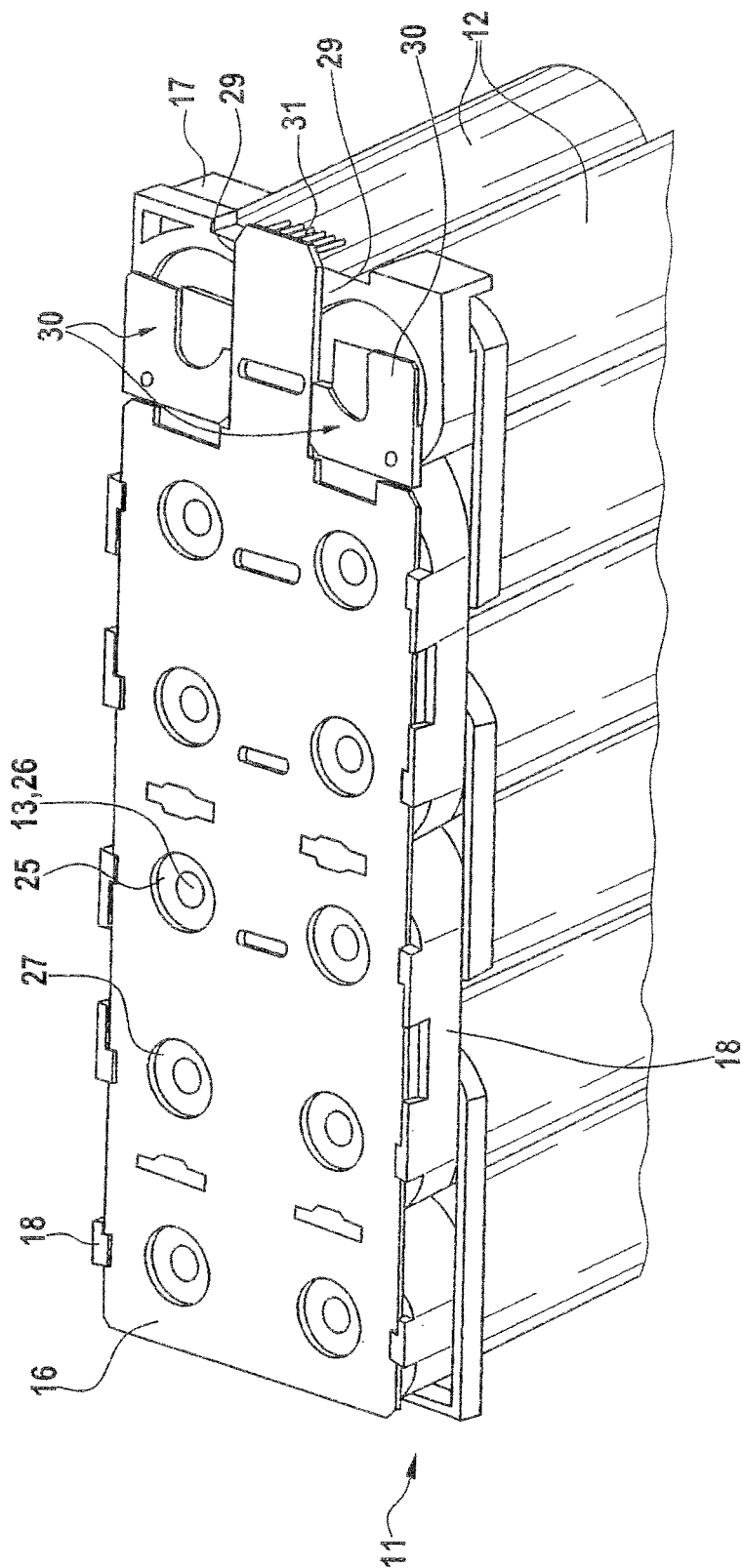
FIG. 3 shows an oblique view of the battery pack comprising the cells fitted with the (in this case: upper) mounting plate.

As can be seen from the view in FIG. 3, the cells 12 are each positioned and held at each of their two ends in interlocking and force-fitting manner with respect to the battery pack 11, in a mounting frame 17 which is injection-molded from electrically insulated plastic. The mounting frame 17 is equipped with integrally formed attachment means 18, for example latching hooks at the edge as shown in the sketch, for holding the mounting plate 16. This can therefore simply be pressed between these attachment means 18 until it latches into the mounting frame 17, with a flexible contact between the cell connectors 15 and the cell pole end surfaces 26. This can also be achieved without any problems by an automatic fitting machine of relatively simple design.

Figure 2:
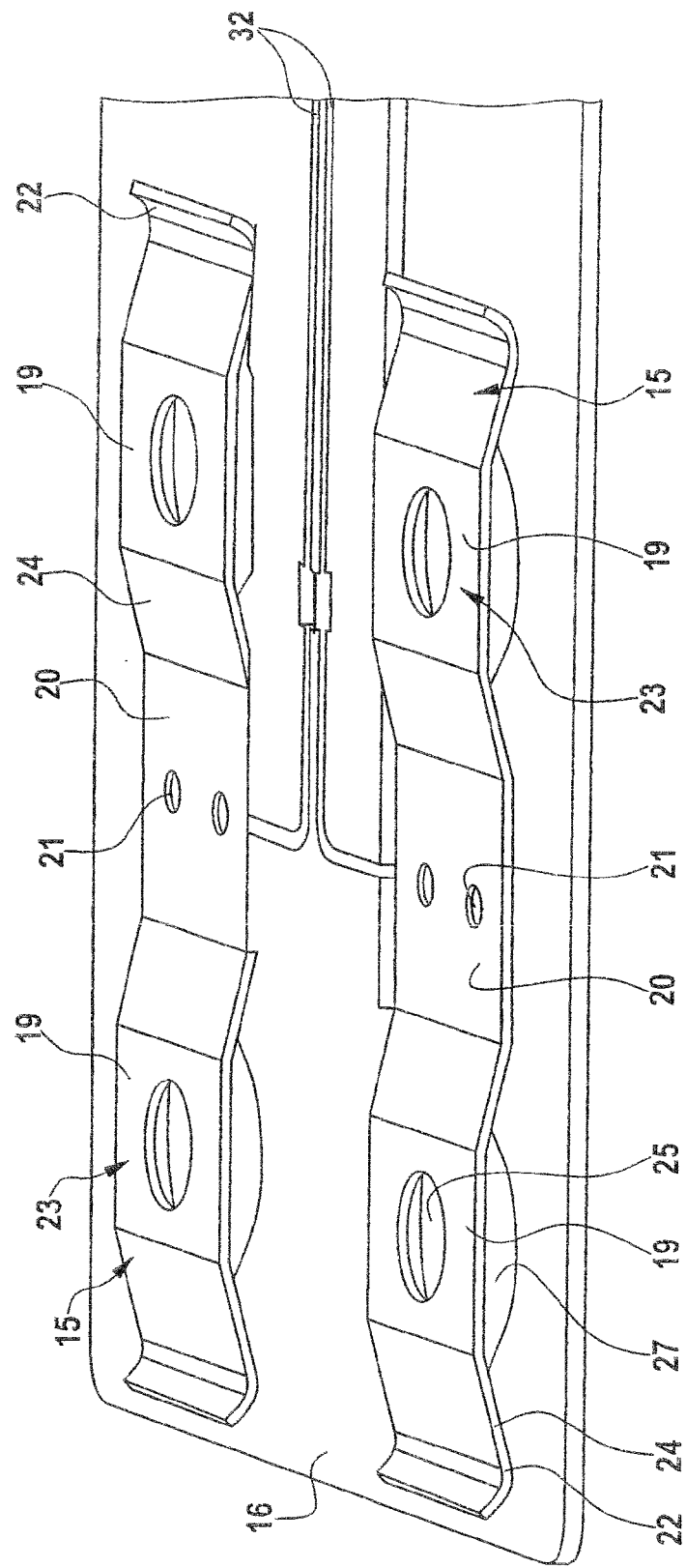
FIG. 2 shows the population of a (in this case: lower) mounting plate from FIG. 1 with its cell connectors, in the form of a broken-open illustration.
Figure 4:
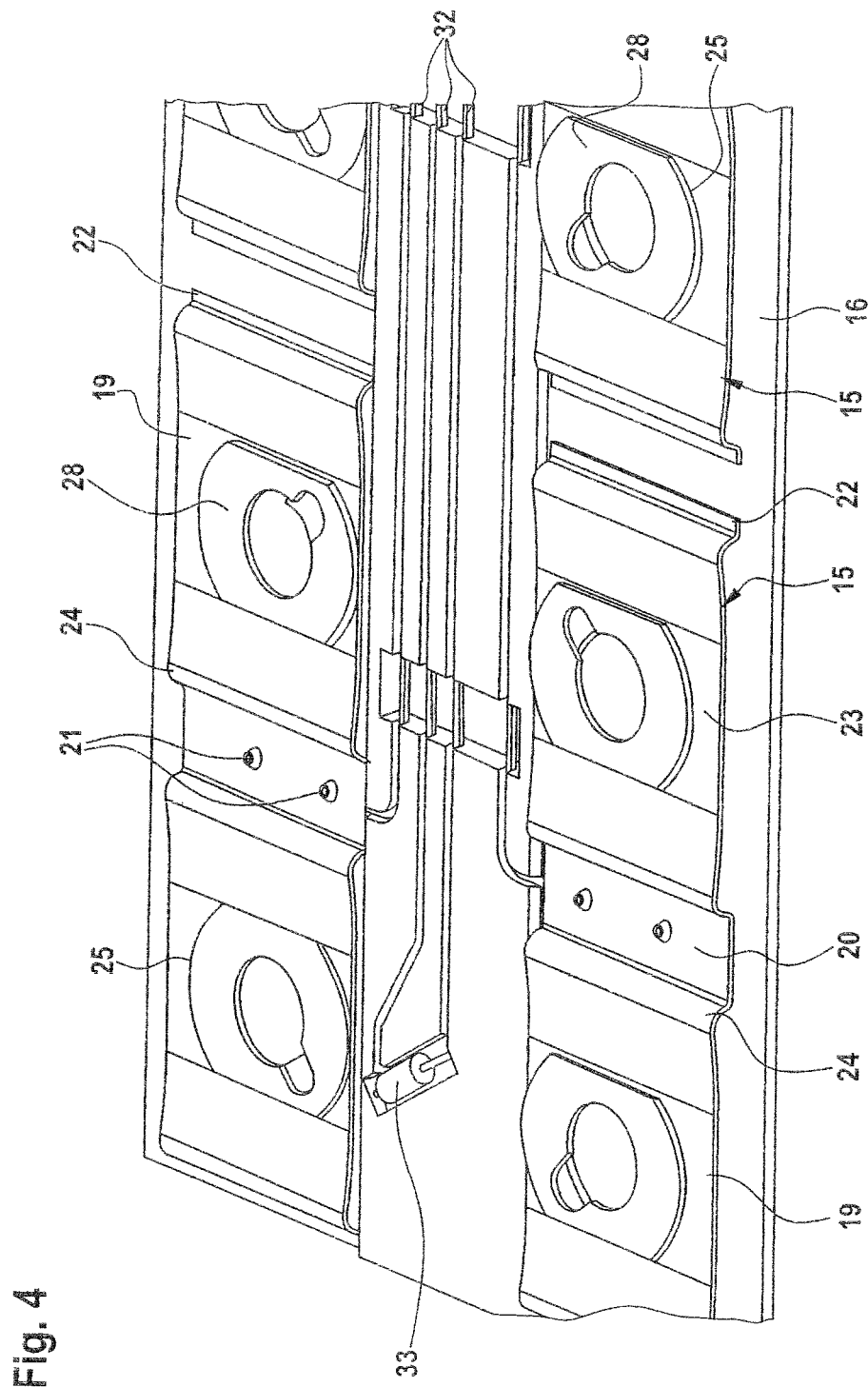
FIG. 4 shows flexible cell connectors with a longitudinal section geometry which has been modified from that shown in FIG. 2 or FIG. 5.

As shown, for example, in FIG. 2, for this series connection technique, each cell connector 15 has two elastically precurved brackets 19, on the basis of the mutually adjacent arrangement of the cell poles of opposite polarity, with their bracket profiles aligned with one another, from the surface plane facing the cells of the mounting plate 16 that is produced by plastic injection molding. These brackets 19 are fixed to the mounting plate 16 in their connection or central area 20, which rests on the mounting plate 16, for example by rivet-like hot staking of pins which project through mounting openings 21 and (although this cannot be seen in the drawing) are integrally formed on this connector-side surface of the mounting plate 16. In the case of the two free ends 22, which are opposite the connection area 20 between the brackets 19, of the respective cell connector 15, the brackets 19 thereof rest loosely against the surface of the mounting plate 16, supported by leaf spring stress. They can thus be shifted along this surface: they are shifted thereon with load-dependent deformation of the respective apex area 23 of the brackets 19. In order to ensure that, in this case, no sharp-edged ends 22 are worked into the plastic of the mounting plate 16, thus in the end impeding or even blocking the elastic deformation of a bracket 19, the free bracket ends 22 themselves expediently end projecting from that contact, as can be seen in FIG. 2. The flanks 25 on both sides of the apex area 23 of a bracket 19 may run in a curved shape, or may be inclined as shown in FIG. 2, or stepped in a similar manner to FIG. 4.

The critical factor is that the height of the apex upward curvature of the spring brackets 19 above the mounting plate 16 decreases elastically when pressure is increasingly exerted onto the apex area 23 in the direction of the mounting plate 16 from the end surface 26 of a cell pole 13 (during cell connector fitting, or resulting from heating during operation).

Holes are formed in the apex areas 23 of the brackets 19 of a cell connector 15, the distance between whose centers corresponds approximately to the distance between the centers of the cell poles 13 to be interconnected by means of the cell connector 15. The hole geometry is smaller than the end surface 26 of the cell pole 13 which presses against the hole 25 in the apex area 23. This is preferably a round hole 25, whose diameter is smaller than the shortest diagonal over the pole end surface 26. The mounting plate 16 has aperture openings 27, for example coaxially with each hole 25, through which openings and through the hole 25 the end surface 26 of the cell pole 13 is permanently electrically conductively connected to the edge of the hole 25, specifically preferably integrally connected, and in particular laser-welded.

Figure 5:
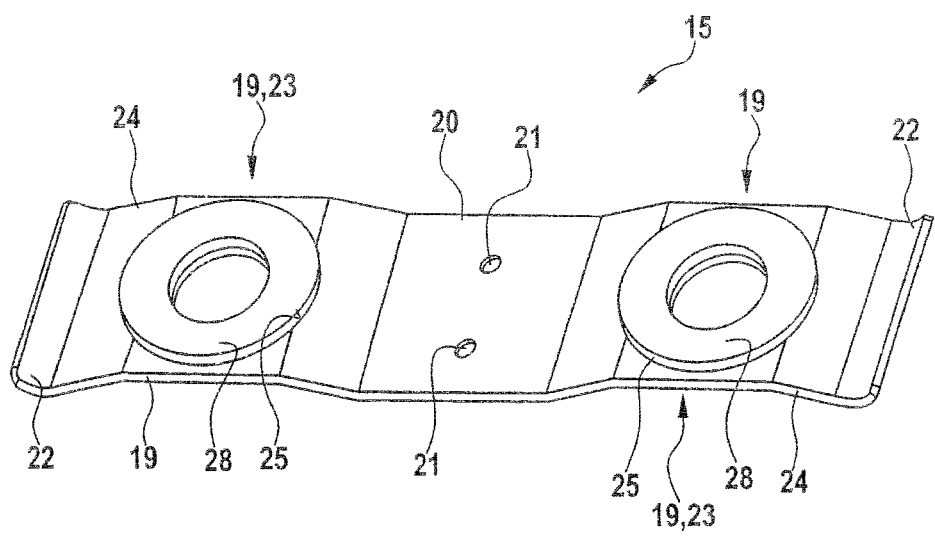
FIG. 5 shows a cell connector equipped with welded connecting pieces, as shown in FIG. 2.

The cell connectors 15 are preferably stamped out of a copper alloy ribbon as short broad strips, with the apex holes 25 and the mounting openings 21 being introduced, in this case centrally between the two holes 25, and with the respective apex area 23 of the brackets 19 being curved up, and the free bracket ends being bent. However, for electrochemical reasons, the cell poles 13 are not composed of copper but, particularly in the case of lithium-polymer rechargeable batteries for traction purposes, are composed of aluminum or of steel, depending on the electrical polarity. For electrically and mechanically reliable welding of the cell poles 13 to the cell connectors 15 homogeneously, in each case one, in this case approximately annular, connecting piece 28 composed of aluminum, of steel or nickel is therefore expediently fitted in a force-fitting manner into the two bracket holes 25 for each bracket 19, cf. FIG. 5; in any case, this is composed of a material which corresponds in terms of welding technology to that of the cell pole end surface 26 which rests thereon. The opening surfaces which remain in the connecting pieces 28 once again comply with the criterion that their contour in each case runs in places in any case over the end surface 26 of the cell pole 13 which rests thereon, in order to allow it to be welded directly thereto, behind the aperture opening 27.

The two cell poles 13 which are not fitted with cell connectors, at the start and at the end of the sketched series circuit, are accessible, for example as is shown in FIG. 3, through board cutouts 29, as shown in FIG. 1, as a positive and a negative battery connection 30.

Plug pins 31, which are suitable for connection of measurement and control circuits for battery management, are inserted into the intermediate space between two cylindrical cells 12 on one side of the battery pack 11, angled out of the plane of the mounting plate 16. These plug pins 31 are the free ends of conductor tracks 32, which are narrow in comparison to the strip widths of the brackets 19 and have been stamped out integrally with the cell connectors 15, in that they remain connected by their ends opposite the pins 31 to the central areas 20 of the cell connectors (cf. FIG. 1). They run on the population-side surface of the plastic mounting plate 16 facing the cell poles 13 and can be firmly clamped thereon in integrally formed spaces, that is to say they can also be at a distance from one another, for electrical isolation. If required, components 33 (cf. FIG. 4), such as charge equalizer resistors or hot conductors, as required for battery management for example, are connected directly on the mounting plate 16, to these conductor tracks 32, which lead to plug pins 31, or to conductor tracks 32, which are additionally stamped free, of a stamped grid such as this.

The sketched exemplary embodiment described above relates to the commonest constellation in which cells arranged with alternating polarities can be electrically connected in series alongside one another; for which purpose the cell connector 15 from linear arrangements requires in each case two elastic contact-making brackets 19. In other arrangement and circuit versions, other configurations of brackets 19 may also be used, however, within the scope of the present invention.

In any case, a device for electrical interconnection of cells 12 of a battery pack 11 by means of cell connectors 15 and a battery pack 11 having such cell connectors 15 are distinguished as being particularly convenient for assembly and particularly functionally reliable in that, according to the invention, at least one mounting plate 16, which can be latched on the battery pack 11 in a mounting frame 17, is fitted with cell connectors 15 which cell connectors 15 are electrically isolated from one another on the basis of the geometric requirement for cell poles 13 to be interconnected with one another, and each have flexible brackets 19 for their apex areas 23 to rest elastically against the end surfaces 26 of cell poles 13. The brackets, which are supported by one flank like bending springs on the mounting plate 16, are part of a stamped grid, which also comprises narrow conductor tracks 32 connected integrally thereto, for example for connection of a battery management means. Holes 25 are preferably stamped into the bracket apex areas 23, along whose contours the brackets 19 are connected integrally to the cell pole end surfaces 26 after the mounting plate 16 has been fitted to the cells 12, in particular by laser welding. For this purpose, the mounting plate 16 has aperture openings 27, which are in contrast larger, coaxially with respect to those holes 25.

Figure 6:
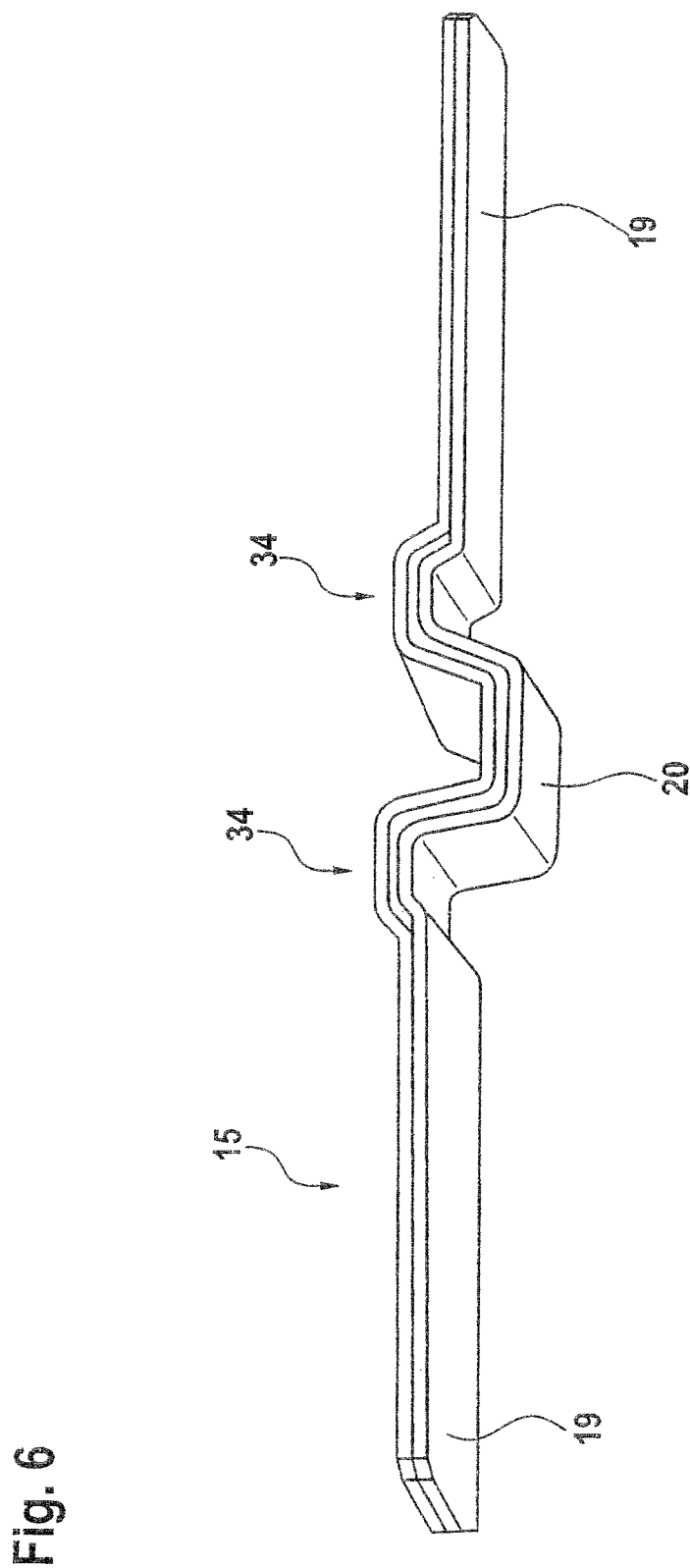
FIG. 6 shows a further refinement of a cell connector.

FIG. 6 shows a further refinement of a cell connector having two brackets 19 which extend away from a connection area 20. In a similar manner to the refinement described above, the brackets 19 have holes 25 in areas for making contact with cell poles.

The brackets 19 in the present refinement are coupled to the connection area 20 via a structure 34 which is designed to be resilient by means of a meandering profile. This makes it possible to compensate for relative movements, caused thermally or mechanically, between a cell connector 15 and the cell poles.

Figure 7:
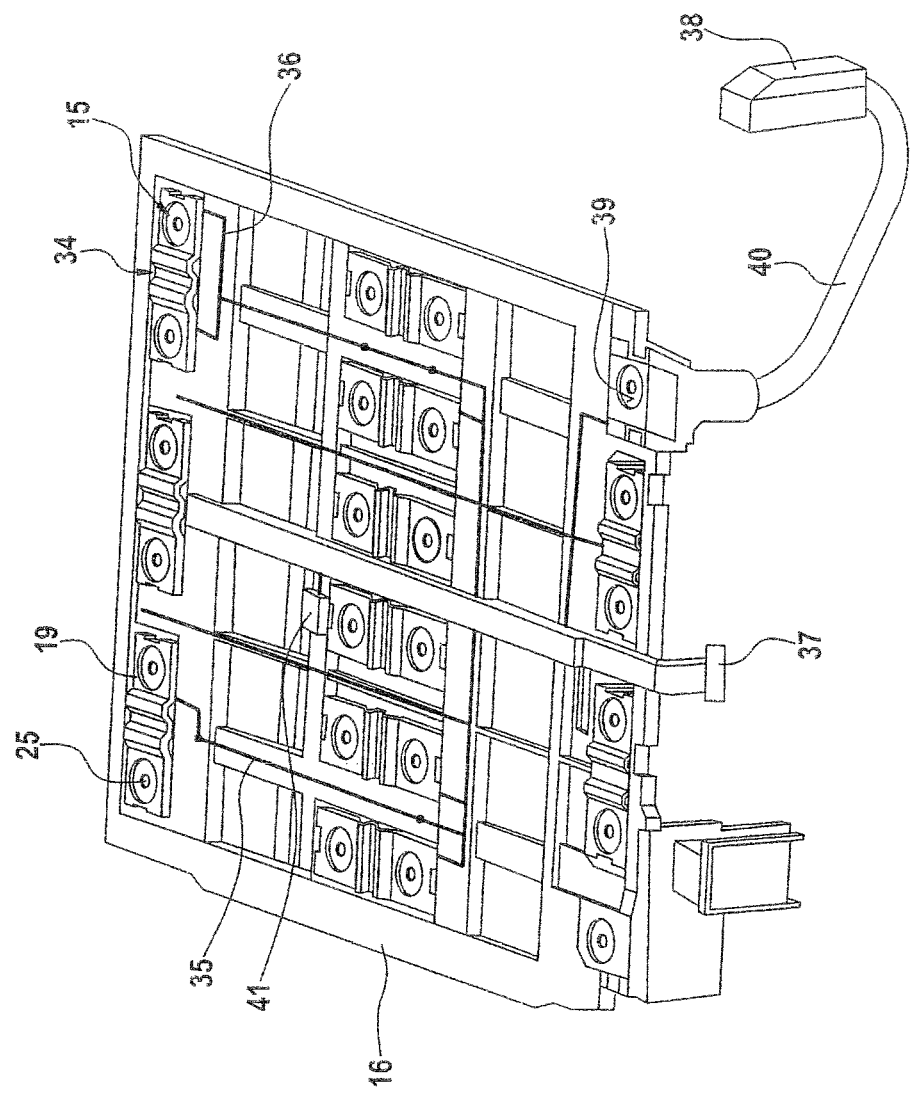
FIG. 7 shows a further refinement of a mounting plate with cell connectors as shown in FIG. 6.

FIG. 7 shows a mounting plate 16 which, in the present case, is in fact a mounting frame which is fitted with the cell connectors 15 described in conjunction with FIG. 6. By way of example, the mounting plate 16 may be produced from a plastic by an injection-molding process, or may be produced from some other suitable material. At points at which the cell connectors 15 come to rest, the mounting plate 16 has recesses. The cell connectors 15 are connected to the mounting plate 16, as a result of which at least the majority of the cell connectors come to rest in the recesses. In this way, the holes 25, possibly with connecting pieces fitted thereto, are exposed, and contact can be made with them by placing the mounting plate 16 onto correspondingly arranged and dimensioned cells with corresponding cell poles. After the mounting plate 16 has been fitted, the cell connectors can also be welded, soldered or connected in an integral, interlocking or force-fitting manner in some other way to the cell poles.

At the ends 22 of the brackets remote from the connection area 20, the cell connectors 15 are held on the mounting plate 16 by appropriate holding means. In the illustrated example, the cell connectors are held in a clamped manner by means of tongues, which project from the mounting plate 16, and grooves which may be provided in the mounting plate 16. Other attachment methods may alternatively or additionally be considered, such as hot staking, screw connection, adhesive bonding, etc.

First conductor tracks 35 are fitted to the webs which separate the recesses in the mounting plate 16, by means of which first conductor tracks 35 the cell connectors 15 are electrically connected to one another such that the cells in the battery pack are connected to one another in the desired manner. Furthermore, second conductor tracks 36 are fitted on the mounting plate 16, and likewise make contact with at least some of the cell connectors 15, and may be used as measurement and diagnosis lines. The second conductor tracks 36 may, for example, be used to measure or to determine parameters, in particular operating parameters, of the cells via appropriate measurement instruments and diagnosis appliances. The first conductor tracks 35 and second conductor tracks 36 can be made contact with via respective electrical plug connections 37 and 38 which may either be directly integrally formed on the conductor tracks, as in the case of the plug connection 37, or may be connected to the conductor tracks, possibly via corresponding intermediate contact areas 39 and cable connections 40, as in the case of the plug connection 38.

Furthermore, at least one temperature sensor 41, for example an NTC temperature sensor (negative temperature coefficient temperature sensor) may be fitted on the mounting plate 16, thus making it possible to detect the temperature, in particular the operating temperature, of the battery pack. In the event of critical temperature values, appropriate measures may be initiated to prevent temperature-dependent damage to the battery pack. By way of example, contact can be made with the temperature sensor 41 via second conductor tracks 36 and, for example, the temperature can be detected and monitored via a measurement instrument or diagnosis appliance connected via the plug connection 37.

LIST OF REFERENCE SYMBOLS

11 Battery pack (from 12)
12 Cell (for 11)
13 Cell poles (of 12, from 14)
14 Ends (of 12)
15 Cell connector (via 13)
16 Mounting plate (for 15, 32)
17 Mounting frame (on 12 for 16)
18 Attachment means (on 17 for 16)
19 Bracket (of 15)
20 Area (between 19-19)
21 Mounting opening (in 20)
22 End (of 15/19)
23 Apex area (of 19, between 24-24)
24 Flanks (of 19, on both sides of 23)
25 Hole (in 23)
26 End surface (of 13)
27 Aperture opening (in 16)
28 Connecting piece (in 25)
29 Cutout (on 16)
30 Battery connection (at 29)
31 Plug pins (at the end of 32)
32 Conductor tracks (integrally on 15)
33 Component (on 32)
34 Meandering structure
35 First conductor track
36 Second conductor track
37, 38 Plug connections
39 Intermediate contact area
40 Cable connection
41 Temperature sensor

The invention claimed is:

1. A device for electrical interconnection of cells of a battery pack by means of cell connectors, wherein a plurality of cell connectors for connection of at least two cell poles are fitted on a mounting plate, electrically isolated from one another,
wherein each cell connector comprises:
a connection area fixedly connected to a top surface of the mounting plate, and
a pair of flexible brackets which extend away from the connection area and are distanced upwardly from the top surface of the mounting plate, wherein each of the pair of flexible brackets contacts a cell pole, wherein each of the pair of flexible brackets is coupled to the connection area by means of a structure that is resilient by means of a meandering profile, and
wherein each of the pair of flexible brackets comprises a bottom surface and a top surface opposite the bottom surface, wherein the bottom surface is distanced upwardly from the top surface of the mounting plate such that each flexible bracket is moveable with respect to the mounting plate through the resilient structure,
wherein the meandering profile comprises a first portion extending angularly from a respective flexible bracket, a second portion extending angularly from the connection area, and a middle portion connecting the first portion and the second portion, wherein the middle portion is parallel to the connection area.

2. The device as claimed in claim 1, wherein the flexible brackets of the cell connectors rest or are held on the mounting plate at bracket ends remote from the connection area of said flexible brackets.

3. The device as claimed in claim 1, wherein the cell connectors are mounted on the mounting plate by rivet-like hot staking.

4. The device as claimed in claim 2, wherein the bracket ends are lifted off from the mounting plate.

5. The device as claimed in claim 1, wherein each flexible bracket has a hole in the contact-making area which is designed for connection to the cell pole.

6. The device as claimed in claim 5, wherein the hole is formed in an apex area of the flexible bracket.

7. The device as claimed in claim 5, wherein the mounting plate has an aperture opening at least in the contact-making areas in which the holes in the flexible brackets are located when the cell connectors are in the attached state.

8. The device as claimed in claim 5, wherein the contour of the hole runs out beyond an end surface of the cell pole, which end surface rests on the flexible bracket.

9. The device as claimed in claim 5, further comprising at least one connecting piece fitted in the hole,
wherein the material of the connecting piece is chosen such that the connecting piece is connected to an end surface of the cell pole through a joining process, in a force-fitting and/or integral manner, wherein the joining process comprises a hot joining process or a cold joining process, wherein the hot joining process comprises at least one of welding and soldering.

10. The device as claimed in claim 1, wherein the mounting plate is fitted with a grid of cell connectors, which is manufactured from copper, a copper alloy, aluminum or an aluminum alloy, wherein the grid comprises a stamped grid, and the mounting plate is also fitted with at least one conductor track which is connected integrally to the cell connectors and is narrower than the cell connectors.

11. The device as claimed in claim 10, wherein at least one of the at least one conductor track has an end which is in the form of a plug pin.

12. The device as claimed in claim 1, wherein the cell connector is manufactured from copper or a copper alloy, from aluminum or an aluminum alloy, and wherein contact-making areas of the cell connector to cell poles are manufactured from copper, a copper alloy, from aluminum, an aluminum alloy, from steel, nickel or a nickel alloy.

13. A battery pack comprising at least one device as claimed in claim 1 and having cells which are interconnected to the at least one device, wherein the cells are grouped in a mounting frame, which is equipped with attachment means for the mounting plate which is fitted with said cell connectors which have elastically deformable brackets which rest against end surfaces of the interconnected cell poles.

14. The battery pack as claimed in claim 13, wherein the end surfaces are each connected in a force-fitting and/or integral manner to an edge of a hole in an apex area of the bracket.

15. The battery pack as claimed in claim 13, wherein the battery pack has at least one plug pin, which is a free end of a conductor track of a stamped grid which is attached to the mounting plate, with the conductor tracks being formed integrally with the cell connectors.

16. The battery pack as claimed in claim 15, wherein components which are connected to the conductor track are fitted on the mounting plate.

* * * * *